(12) United States Patent
Lee et al.

(10) Patent No.: US 9,550,167 B2
(45) Date of Patent: Jan. 24, 2017

(54) METHOD FOR PREPARING HOLLOW CARBON STRUCTURE USING CRACKING REACTION OF HEAVY HYDROCARBON FRACTION

(71) Applicant: University-Industry Foundation, Yonsei University, Seoul (KR)

(72) Inventors: Chang Ha Lee, Seoul (KR); Koriakin Anton, Seoul (KR); Doo Wook Kim, Seoul (KR); Eun Ji Woo, Gyeonggi-do (KR)

(73) Assignee: University-Industry Foundation, Yonsei University, Seoul (KR)

( * ) Notice: Subject to any disclaimer, the term of this patent is extended or adjusted under 35 U.S.C. 154(b) by 0 days.

(21) Appl. No.: 14/674,023

(22) Filed: Mar. 31, 2015

(65) Prior Publication Data
US 2015/0283535 A1     Oct. 8, 2015

(30) Foreign Application Priority Data
Mar. 31, 2014   (KR) ...................... 10-2014-0037932

(51) Int. Cl.
| | |
|---|---|
| *C01B 31/02* | (2006.01) |
| *B01J 20/20* | (2006.01) |
| *C01B 31/00* | (2006.01) |
| *B01J 20/30* | (2006.01) |

(52) U.S. Cl.
CPC .............. *B01J 20/20* (2013.01); *B01J 20/3078* (2013.01); *C01B 31/00* (2013.01); *C01B 31/02* (2013.01); *C01P 2004/90* (2013.01)

(58) Field of Classification Search
CPC .... C01B 31/02; C01P 2004/34; C01P 2004/90
See application file for complete search history.

(56) References Cited

U.S. PATENT DOCUMENTS 7,718,155 B2 *   5/2010   Zhang ...................... B01J 21/18
                                                     423/445 R

FOREIGN PATENT DOCUMENTS

| JP | 2010-222239 A | 10/2010 |
|---|---|---|
| JP | 2013-166849 A | 8/2013 |
| KR | 1020030029035 | 4/2003 |
| KR | 1020120075368 | 7/2012 |
| KR | 1020150030819 | 3/2015 |

OTHER PUBLICATIONS

Office Action issued on Jan. 12, 2016 against the corresponding Japanese Application 2015-074511 by Japanese Patent Office.
Ji Bong Joo, et al., "Simple Preparation of Hollow Carbon Sphere Via Templating Method," Science Direct, Current Applied Physics, 8 ed., Elsevier, (p. 814-817), (2008).

* cited by examiner

*Primary Examiner* — Stuart Hendrickson
(74) *Attorney, Agent, or Firm* — Hammer & Associates, P.C.

(57) ABSTRACT

The present invention relates to a method of preparing a hollow carbon structure. The method includes a step of calcining a solid component separated after a cracking reaction of a heavy hydrocarbon fraction; and a step of performing an acid treatment or base treatment on the solid component calcined in the above-described step.

The present invention provides a method of preparing a hollow carbon structure which may be used to separate carbon dioxide, to remove a sulfur compound, and as a carrier of various substances by performing various pre-processes on carbon generated on a surface of a spent catalyst which is used in a cracking reaction of a heavy hydrocarbon fraction.

10 Claims, 7 Drawing Sheets

METHOD FOR PREPARING HOLLOW CARBON STRUCTURE USING CRACKING REACTION OF HEAVY HYDROCARBON FRACTION

TECHNICAL FIELD

The present invention relates to a method for preparing a hollow carbon structure using a cracking reaction of a heavy hydrocarbon fraction and a carbon structure prepared by the method.

BACKGROUND ART

Natural gas is one of the three major energy sources of the world together with petroleum and coal, and the production and consumption of natural gas has largely increased since the 2000s. Since natural gas generates a smaller amount of greenhouse gases than fossil fuels, natural gas is expected to gradually come to play an important role in world energy supply. However, sulfur compounds such as hydrogen sulfide, mercaptans, and tetrahydrothiophene which are included in natural gas are converted into SOx during the combustion, thereby causing acid rain, and toxifying catalysts used in processes. Accordingly, a variety of solutions have been suggested to remove sulfur compounds.

In military aspects, atomic, biological and chemical (ABC) weapons are formed of halogen compounds including elemental sulfur, and activated carbon particles were put into military protective clothing for chemical, biological, and radiological (CBR) battles so as to protect soldiers. However, when activated carbon is used for military protective clothing, heavy activated carbon may negatively affect the activity of the soldiers, and thus there is a demand for a substitute for activated carbon, which may have the same performance as the activated carbon and improve the mobility of the soldiers.

Further, various substances capturing carbon dioxide, which are prepared by impregnating porous activated carbon with amine-based absorbents, have been developed recently as technologies for coping with climate change. There is a strong demand for further effective porous materials for improvement of such technologies.

The important factor in the removal of sulfur compounds, the separation of carbon dioxide, and the use of porous carrier is to select a suitable adsorbent. Various adsorbents may be applied, but the important factor for the effective use is high adsorption capacity to a target substance and conditions for easy desorption. When adsorption capacity is high, but desorption is difficult, a high adsorbent regeneration cost is required, and thus leading to difficulties and inefficiency in the technological application. Further, when a mixture as a process target has moisture, the performance of an adsorbent may be rapidly decreased due to the moisture. Accordingly, moisture resistance is also regarded as a key indicator in the selection of an adsorbent.

Although the production and consumption of natural gas have increased, petroleum resources are the major energy source which has been leading the world industry, and the influence of the petroleum resources on the world economy and industry is very important. There are increasing concerns about limitation on and maldistribution of petroleum resources. Further, with the increase in national income, the demand for transport fuels, particularly, the demand for light oil products, has continuously increased, but the demand for heavy hydrocarbon products such as bunker fuels or the like has decreased, and the rate of high-sulfur-containing and heavy crude oil in the produced crude oil has increased more than in the past.

Since crude oil reserves are globally decreasing and oil prices continue to rise over time, there are increasing demands for reforming of cheap heavy hydrocarbon fractions such as bitumen or the like which substitutes for crude oil in addition to ultra-high-sulfur-containing heavy oil and oil sand, and technologies for high-value-added heavy hydrocarbon fractions are receiving attentions according to such current trends.

Gasification, delayed coking, residue fluid catalytic cracking (RFCC), hydrocracking or the like has been known as examples of conversion processes. According to the reaction conditions of the above-described conversion processes, a solid by-product having carbon as a main component is generated at a certain ratio from a part of heavy hydrocarbon fractions with the production of light oil. Accordingly, when light oil may be prepared through the above-described processes, and a solid carbon by-product may also be prepared as a carbonaceous material having excellent selectivity, adsorption capacity, and stability through various pre-processes, it is expected that high-added value may be realized.

DISCLOSURE

Technical Problem

The present invention is directed to providing a method of preparing a hollow carbon structure which may be used to separate carbon dioxide and remove a sulfur compound, and as a carrier of various substances by performing various pre-processes on carbon generated on a surface of a spent catalyst which is used in a cracking reaction of a heavy hydrocarbon fraction using a catalyst.

Technical Solution

One aspect of the present invention provides a method of preparing a hollow carbon structure, which includes a step of calcining a solid component including a residue of a heavy hydrocarbon fraction, a carbonaceous material generated during a reaction, and a spent catalyst separated after a cracking reaction of a heavy hydrocarbon fraction; and a step of performing an acid treatment or base treatment on the solid component calcined in the above-described step.

Further, another aspect of the present invention provides a hollow carbon structure prepared using the above-described preparation method.

Advantageous Effects

A hollow carbon structure according to an embodiment of the present invention is prepared by performing various pre-processes on a carbonaceous material generated on a surface of a spent catalyst which is used in a cracking reaction of a heavy hydrocarbon fraction using a catalyst. Accordingly, it is advantageous in that light oil may be prepared using a heavy hydrocarbon fraction, and a carbon material(hollow carbon structure) may be prepared using a by-product of the heavy hydrocarbon fraction, thereby reducing a manufacturing cost.

Further, a catalyst surface is coated with a nanometer-thick carbon material by a cracking reaction of a heavy hydrocarbon fraction, and the thickness of the carbon material may be adjusted according to cracking reaction conditions of a heavy hydrocarbon fraction.

Further, a catalyst inside the carbon material is removed by an acid treatment or base treatment, and thus the size of an empty space inside the carbon material may be easily adjusted by changing the size of the catalyst to be used. Since this carbon material has excellent selectivity and adsorption capacity for a sulfur compound, the carbon material may be usefully used as an adsorbent to remove a sulfur compound, and has water resistance due to the properties of carbon.

Further, since the carbon material has high porosity and a specific surface area, the carbon material may serve to remove carbon dioxide and as various carriers.

MODES OF THE INVENTION

The present invention relates to a method of preparing a hollow carbon structure, which includes a step of calcining a solid component including a residue of a heavy hydrocarbon fraction, a carbonaceous material prepared during a reaction, and a spent catalyst separated after a cracking reaction of a heavy hydrocarbon fraction; and a step of performing an acid treatment or base treatment on the solid component calcined in the above-described step.

In the present invention, a "hollow carbon structure" is a carbon structure prepared using the above-described production method, and may have a hollow inside and an outside shell formed of a porous carbon material, more specifically, a porous graphite layer. The hollow carbon structure may be used to separate carbon dioxide and remove a sulfur compound, and may also be used as a carrier of various substances.

Hereinafter, a hollow carbon structure according to an embodiment of the present invention will be described in detail.

As described above, a hollow carbon structure according to the embodiment of the present invention is prepared through a step of calcining a solid component separated after a cracking reaction of a heavy hydrocarbon fraction; and a step of performing an acid treatment or base treatment on the solid component calcined in the above-described step.

In the present invention, the cracking reaction of a heavy hydrocarbon fraction is a process of converting a heavy hydrocarbon fraction into hydrocarbon oil which has a lower boiling point than the heavy hydrocarbon fraction, and the cracking reaction of a heavy hydrocarbon fraction generally used in the related art may be used as the above-described cracking reaction.

In the embodiment, the cracking reaction of a heavy hydrocarbon fraction may include a step of performing a cracking reaction of a heavy hydrocarbon fraction by controlling internal conditions of a reactor having a hydrocarbon solvent, a heavy hydrocarbon fraction, and a catalyst contained therein to be in a supercritical or subcritical state; and a step of separating a liquid oil fraction and a solid component prepared by the cracking reaction.

In the cracking reaction of a heavy hydrocarbon fraction, an example of the heavy hydrocarbon fraction may include a hydrocarbon oil fraction having a boiling point of 360° C. or more, and more specifically, a deasphalted (e.g., solvent deasphalting (SDA)) hydrocarbon oil fraction having a boiling point of 360° C. or more may be used. Examples of this heavy hydrocarbon fraction may include crude oil, an atmospheric residue, a vacuum residue, a residue of a hydrogenation reaction, oil sand, or the like, and more specifically, a vacuum residue may be used. Here, the boiling point of the heavy hydrocarbon fraction may denote an initial boiling point (IBP) or a distillation point of 5%.

Particularly, in the present invention, it may be understood that hydrocarbon fraction partially containing hydrocarbon fraction of about 360° C. or less or hydrocarbon fraction containing a material insoluble in a hydrocarbon solvent which will be described below may also be used as the heavy hydrocarbon fraction.

In general, the cracking reaction of a heavy hydrocarbon fraction is performed at a high temperature and high pressure, and may be performed in a supercritical in which a temperature and pressure are equal to or more than a critical temperature and a critical pressure of the specific solvent or a subcritical state.

In the supercritical or subcritical state, a solvent moves in a liquid phase similar to a gas, here, viscosity is significantly reduced, and thus transfer characteristics are improved. Since the diffusion rate of a catalyst in a pore inlet increases in the supercritical or subcritical state, mass transfer limitations and coking may be minimized. Further, a solvent in the supercritical or subcritical state exhibits an excellent hydrogen-shuttling ability, and also has excellent dissolution performance with respect to the intermediate of a heavy hydrocarbon fraction, which is a precursor forming tar.

In the present invention, an example of a solvent may include a hydrocarbon solvent, specifically, an aromatic hydrocarbon or n-hydrocarbon solvent, and more specifically, a solvent containing xylene, dodecane, tetralin, or a mixture thereof. Particularly, tetralin not only serves as a strong hydrogen supply source, but also may be easily used as a solvent or an additive due to a high conversion rate to low boiling point hydrocarbon fraction.

In the present invention, the content of a hydrocarbon solvent with respect to the heavy hydrocarbon fraction is not particularly limited, for example, may be in the range of 50 to 1,500 parts by weight, specifically, in the range of 100 to 1,000 parts by weight, more specifically, in the range of 150 to 800 parts by weight with respect to 100 parts by weight of a heavy hydrocarbon fraction.

In the cracking reaction of a heavy hydrocarbon fraction according to the embodiment of the present invention, a reaction may be perform using a catalyst in addition to a heavy hydrocarbon fraction and a hydrocarbon solvent. The catalyst may be used to effectively perform the cracking reaction (reforming reaction) of a heavy hydrocarbon fraction, and a powder-type catalyst may be used.

As such a catalyst, a metal-based or non-metal-based oxide catalyst may be used.

For the metal-based oxide catalyst, the type of metal component is not particularly limited, for example, a metal component may be Mo, W, V, Cr, Co, Fe, Ni, Mg, Al, or a combination thereof, and specifically, an iron oxide catalyst. An example of the iron oxide catalyst may include $Fe_3O_4$. Further, the non-metal-based oxide catalyst may be silicon dioxide ($SiO_2$).

Further, the catalyst may have the form of being carried by a support. Examples of the support which may be used herein may include inorganic oxide (e.g., alumina, silica, silica-alumina, zirconia, titania, magnesium oxide, a combination thereof, etc.)

The cracking reaction of a heavy hydrocarbon fraction according to the embodiment of the present invention includes a step of controlling internal conditions of a reactor having the above-described heavy hydrocarbon fraction, a hydrocarbon solvent, and a catalyst contained therein to be in a supercritical or subcritical state.

In the embodiment, a heavy hydrocarbon fraction, a hydrocarbon solvent and a catalyst are introduced into a reactor for the cracking reaction. Here, a mixing step may be selectively performed to increase the contact between the heavy hydrocarbon fraction and the hydrocarbon solvent for the easy reaction of a heavy hydrocarbon fraction. To this end, a mixture may be sonicated.

In the embodiment, the catalyst may be introduced into a reactor, in the form of a particle (e g, filling up type or flowing type) or a colloid in which catalyst particles are dispersed in a solvent.

In the present invention, the reforming reaction of a heavy hydrocarbon fraction may be easily performed by controlling the internal conditions of a reactor to be in a supercritical or subcritical state. Here, temperature and pressure conditions to control the internal conditions of the reactor to be in a supercritical or subcritical state, may be a temperature and pressure equal to or higher than a critical point of a hydrocarbon solvent. A hydrocarbon solvent moves in a supercritical state under conditions in which the temperature and pressure are equal to or higher than a critical point, and reforming of a heavy hydrocarbon fraction may be easily performed. Further, since the effect similar to the above-described effect may be achieved under conditions of temperature and pressure near those of critical conditions, a pressure and temperature inside a reactor may be adjusted in consideration of this.

In the embodiment, a cracking reaction may be performed in the low pressure range, using a small amount of hydrogen, and the reaction may be performed by heating up to a reaction temperature under conditions of room temperature and a hydrogen pressure (gas partial pressure) of 30 bar or less, more specifically, 20 bar or less. Here, a room temperature refers to, for example, a temperature in the range of 15 to 25° C., specifically, in the range of 18 to 24° C. A hydrocarbon solvent, particularly, tetralin changes into naphthalene under the above-described reaction conditions, serving as a hydrogen donor, and thus tetralin is more advantageous than other solvents (e.g., xylene, dodecane, etc.) in that no gas is injected, and thereby operating cost is reduced. The cracking reaction is not limited to the cracking reaction using hydrogen, the reaction may be performed using nitrogen or air, and may also be performed without supplying any gas.

When the internal conditions of a reactor are controlled to be in a supercritical or subcritical state, a heavy hydrocarbon fraction is converted into high-value fraction by a reforming reaction, and this reforming reaction may be performed by a cracking reaction.

Further, examples of a reactor according to the embodiment of the present invention may include a fixed bed reactor, an ebullating reactor, or a slurry reactor.

An exemplary process of the cracking reaction of a heavy hydrocarbon fraction according to the embodiment of the present invention is disclosed in "a method of processing a heavy hydrocarbon oil fraction" (Korean Application No. 10-2013-0109792). Referring to the above-described process, the cracking reaction of a heavy hydrocarbon fraction may be performed.

The method according to the embodiment of the present invention may include a step of separating a liquid oil fraction and a solid component prepared by the cracking reaction.

A product obtained by the above-described cracking reaction may be classified into a liquid oil fraction and a solid component. An example of the liquid oil fraction may include a low boiling point hydrocarbon fraction such as a middle distillate, naphtha, vacuum gas oil (VGO), etc. After the liquid oil fraction undergoes further processes, a middle distillate may be used to produce diesel oil, jet oil, and the like, and naphtha may be used to produce gasoline, and furthermore, may undergo a catalytic reforming reaction process. The gas oil may be used as a feedstock of catalytic cracking or a hydrocracking reaction.

Further, the solid component may include a spent catalyst, a residue of a heavy hydrocarbon fraction and a carbonaceous material prepared during a reaction, and the spent catalyst, the residue of a heavy hydrocarbon fraction and the carbonaceous material prepared during a reaction may be present in a mixed state. Particularly, the spent catalyst may have the residue of a heavy hydrocarbon fraction and the carbonaceous material on the surface thereof.

According to the embodiment of the present invention, a hollow carbon structure may be prepared using this solid component.

The method of preparing a hollow carbon structure according to the embodiment of the present invention includes a step of calcining the solid component; and a step of performing an acid treatment or base treatment on the solid component calcined in the above-described step.

In the method of producing a hollow carbon structure according to the embodiment of the present invention, a step of cleaning and drying the solid component may be performed before the step of calcining the solid component. The cleaning process is to remove a residue of a heavy hydrocarbon fraction in the solid component, may be performed using toluene, acetone, or a mixture thereof, and may be performed once or more. After the cleaning process, the solid component may be dried at a temperature in the range of 50 to 120° C., specifically, in the range of 80 to 100° C.

In the method of producing a hollow carbon structure according to the embodiment of the present invention, the step of calcining the solid component is a step to convert the residue of a heavy hydrocarbon fraction into a carbonaceous material, and specifically, the residue of a heavy hydrocarbon fraction which has not removed in the step of cleaning may be converted into a carbonaceous material by calcination.

This calcination may be performed at a temperature in the range of 550 to 650° C., specifically, in the range of 575 to 625° C. for 1 to 12 hours, and more specifically, for 4 to 6 hours. The residue of a heavy hydrocarbon fraction may be easily converted into a carbonaceous material at a temperature and time in the above-described range. When a calcination temperature is high, a metal oxide (e.g., iron oxide) in a catalyst reacts with carbon to form iron and carbon monoxide, and thus it is disadvantageous in that a conversion rate to a carbonaceous matter is reduced. The calcination may be performed under nitrogen gas flow.

The method of preparing a hollow carbon structure according to the embodiment of the present invention includes a step of performing an acid treatment or base treatment on the solid component calcined in the above-described step. A catalyst component is removed by the acid treatment or base treatment, and thereby a structure having a hollow inside may be prepared.

The type of an acid or base used in the acid treatment or base treatment is not particularly limited, examples of the acid may include hydrochloric acid, sulfuric acid, nitric acid, hydrofluoric acid, or the like, and examples of the base may include sodium hydroxide, potassium hydroxide, etc.

More specifically, the type of an acid or base is selected depending on the type of a catalyst to be used. For example, when iron oxide ($Fe_3O_4$) is used as a catalyst, hydrochloric acid, sulfuric acid or nitric acid may be used as an acid. When sulfuric acid or nitric acid is used, the sulfuric acid or nitric acid may change a surface functional group of a carbon structure. Further, when silicon dioxide ($SiO_2$) is used as a catalyst, hydrofluoric acid, sodium hydroxide or potassium hydroxide may be used.

In the embodiment, if a catalyst may be completely removed by the acid and base, the pH of the acid and base is not particularly limited.

Further, an acid or base may be a mixed solution of an acid or base and distilled water. Here, the volume ratio of an acid or base to distilled water may be in the range of 1:1 to 1:5, and specifically, in the range of 1:2 to 1:4.

The step of the acid treatment or base treatment may be performed for 6 to 20 hours by immersing a calcined solid component, that is, a carbonaceous material in an acid or base, and stirring until the magnetic property of the carbonaceous material is completely removed.

In the embodiment, the acid treatment or base treatment may be performed once or more, the magnetic property of a carbonaceous material is generally removed after twice of the acid treatment or base treatment, and when the magnetic property of a carbonaceous material is not removed, a mixture of an acid or base and the solid component calcined may be heated. Here, heating may be performed at 50° C. or more, specifically, at 80° C. or more.

According to the embodiment of the present invention, a step of performing cleaning and drying may be performed after an acid treatment or base treatment, and the separation of an acid and a solid component. Here, the cleaning process may be performed once or more using distilled water, and the drying process may be performed at a temperature of 50° C. or more, specifically, in the range of 80 to 100° C.

A catalyst is removed by the acid treatment or base treatment, and thereby a carbon structure having a hollow inside may be prepared. The external shell of the carbon structure may be formed of a carbon material. The carbon structure prepared through the acid treatment or base treatment contains a sulfur component.

Accordingly, the carbon structure may be used to prepare a battery material, and a step of a secondary calcination which will be described below may be performed to remove a sulfur component.

The method of preparing a hollow carbon structure according to the embodiment of the present invention may include a step of the secondary calcination of a solid component subjected to an acid or base treatment. According to the embodiment of the present invention, an amorphous carbonaceous material may be changed to have the crystalline form of graphite, and a sulfur component remaining in the carbonaceous material may be removed.

The secondary calcination may be performed at a temperature in the range of 700 to 1,200° C., specifically, in the range of 750 to 850° C. for 1 to 12 hours, and more specifically, for 3 to 5 hours. A carbon structure may be easily prepared at a temperature and time in the above-described range. The secondary calcination may be performed under nitrogen gas flow.

Further, the present invention relates to a hollow carbon structure prepared by the above-described production method. For example, a hollow carbon structure prepared by a preparation method according to the embodiment of the present invention is bubble-shaped, and thus may be referred to as a "carbon bubble."

The inside of a hollow carbon structure according to the embodiment of the present invention is hollow, and specifically, a carbon structure may have micropores and mesopores. When a solid component separated after a cracking reaction is calcined, organic components included in the solid component is evaporated or functional groups thereof are bonded, and thereby the micropores may be formed. When a solid component is subjected to an acid or base treatement, a catalyst is removed, and thereby the mesopores may be formed.

The sizes of the micropores and the mesopores may vary according to the type of a heavy hydrocarbon fraction, the conditions of a calcination process, the type of a catalyst, the size of a catalyst, etc. For example, a micropore may have a pore size of 2.0 nm or less, 1.5 nm or less or 1.0 nm or less, and a mesopore may have a pore size in the range of 2 to 80 nm, 5 to 70 nm, or 10 to 60 nm.

Further, the outside (shell) of a hollow carbon structure is formed of a porous carbon material. Particularly, the outside of a carbon structure prepared through a secondary calcination process may be formed of graphite.

The thickness of the shell of the hollow carbon structure may be in the range of 1 to 10 nm or 2 to 8 nm.

As described above, a hollow carbon structure according to the embodiment of the present invention has a hollow inside and a high specific surface area such that it may be used as a carrier, and has an excellent desorption capability at a low pressure such that it may be used as an adsorbent for separating carbon dioxide, thereby reducing regeneration process cost. Further, the hollow carbon structure according to the embodiment of the present invention has an excellent selectivity and adsorption capacity for a sulfur compound, and thus may be used in a desulfurizer.

EXAMPLE

Hereinafter, the present invention will be described in detail with reference to examples according to the present invention and comparative examples not according to the present invention, but the scope of the present invention is not intended to be limited to the following examples.

Example 1

1. Material (1) Sample

A vacuum residue provided from a commonly-used process was used as a sample, and the physical characteristics of the used vacuum residue were shown in the following Table 1. According to an analysis result, a vacuum residue contained a component having a boiling point of 525° C. or more at 94.2 wt %, and the amount of a vacuum residue that may be recovered at a temperature of 750° C. was about 62.6 wt %.

TABLE 1

| CCR (wt %) | 23.03 |
|---|---|
| S (wt %) | 5.32 |
| N (wt %) | 0.289 |
| Ni (wppm) | 38.4 |
| V (wppm) | 104.2 |
| Fe (wppm) | 23.2 |
| Viscosity (cSt, 100) | 3,580 |
| Cut point (wt %) | |
| naphtha (0-177° C.) | 0.0 |
| middle distillate (177-343° C.) | 0.0 |
| vacuum gas oil (343-525° C.) | 5.8 |
| residue (525-750° C.) | 56.8 |

(2) Solvent

M-xylene (chromasolv-HPLC-grade) manufactured by Sigma-Aldrich corporation was used as a solvent in Examples 1 and 3, and tetralin (anhydrous grade) was used as a solvent in Example 2.

(3) Gas

Hydrogen was used as a gas injected during a reforming reaction, and pressurized using H-YR-5062 which is a high pressure controller having a partition pressure range of 0 to 15 MPa.

(4) Catalyst $Fe_3O_4$ (50 nm, spherical) manufactured by Sigma-Aldrich Corporation was used as a catalyst in Examples 1 and 3, $Fe_3O_4$ (30 to 50 nm) which was synthesized in a laboratory was used as a catalyst in Example 2.

A method of synthesizing iron oxide in a laboratory is as follows. 6.00 g of $FeSO_4 \cdot 7H_2O$ (Yakuri Pure Chemicals Co. LTD), 8.63 g of $Fe_2(SO_4)_3 \cdot nH_2O$ (Cica Co.), and 0.75 g of $(NH_4)_2C_2O_4$ (Yakuri Pure Chemicals Co. LTD) were mixed in deoxygenated distilled water, while a temperature was maintained to 78° C. After a solution which came to have a pH of 9 by NaOH was stirred at 300 rmp for 1 hour, an object generated therefrom was separated using a magnet, and was cleaned several times using distilled water and ethanol.

(5) Device and Test Method (a) Cracking Reaction of Heavy Hydrocarbon Fraction

The cracking reaction (reforming reaction) of a heavy hydrocarbon fraction was performed in a laboratory-scale batch reactor, which was designed to endure at most 873 K and 40 MPa. The capacity of the reactor was 200 ml, and Inconel 625 which is a nickel-based alloy was used as the material thereof to prevent the reactor from being corroded. Two of a thermoelectric couple were each located at the middle of the reactor and at a heater, and were adjusted within 5K using a thermostat. The ratio of a solvent to a vacuum residue was about 4:1, and $Fe_3O_4$ manufactured by Sigma-Aldrich corporation was used as a catalyst.

A vacuum residue, a solvent and a catalyst were mixed while being ultrasonically treated for about 20 minutes, introduced into the reactor, and then further stirred at 400 rpm in the reactor. Then, a nitrogen gas was introduced into the reactor, and thereby air was removed from the reactor. When the reactor was heated at a rate of about 30 K/min and reached a temperature of 380° C., a hydrogen gas was introduced to the reactor, and when the reactor was further heated and reached a reaction temperature (400° C.), a reforming reaction was conducted for 30 minutes. After the reaction, the heater was removed from the reactor, and then rapidly cooled to room temperature using water. Liquid/solid products were completely collected from the reactor using 10 ml of the same solvents. A liquid oil fraction and a solid component in the product were separated using a magnet and Qualitative filter paper (Whatman, Grade 2). The solid component has the form of a mixture of a vacuum residue component, a $Fe_3O_4$ component used as a catalyst, and a carbonaceous material component produced during a reaction. In order to remove a vacuum residue component therefrom, the solid component was cleaned several times using toluene and acetone, and then completely dried at 90° C.

(b) Preparation of Hollow Carbon Structure

Next, the solid component was calcined at 600° C. for 5 hours under nitrogen gas flow. The solid component was immersed in an acid solution having hydrochloric acid and distilled water at the volume ratio of about 1:3 to remove an iron (Fe) component, and an acid treatment was conducted for 6 to 9 hours while an acid solution was changed until the magnetic property of the solid component is removed. After an acid solution and a solid matter were separated, the solid matter was cleaned using distilled water, and further completely dried at 90° C. Thereafter, the secondary calcination was conducted at 800° C. for 4 hours under nitrogen gas flow.

Figure 1:
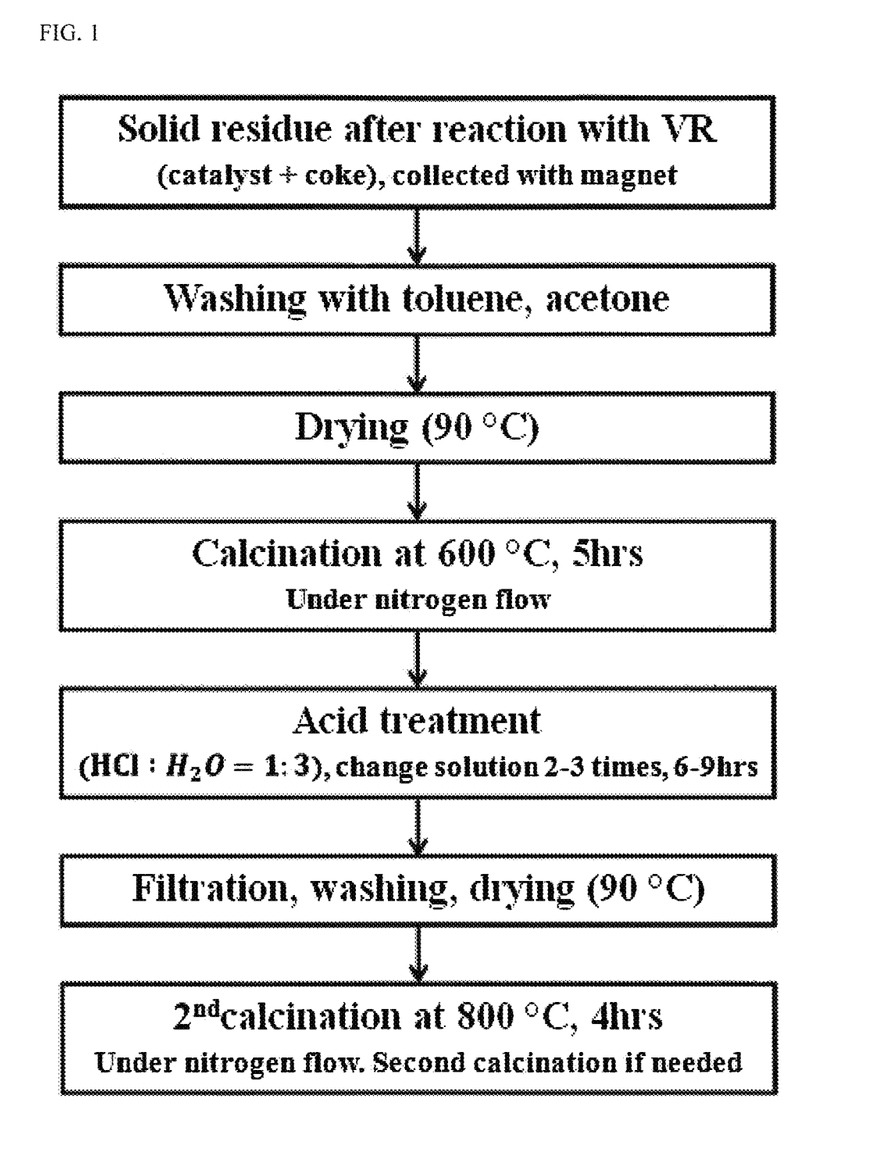
FIG. 1 shows a process diagram to produce a hollow carbon structure according to an embodiment of the present invention.

FIG. 1 shows a schematic diagram showing a process of preparing a hollow carbon structure (carbon bubble) using a solid component obtained from the cracking reaction of the heavy hydrocarbon fraction.

Example 2

(a) The same method as in Example 1 was used except that tetralin was used as a solvent, and $Fe_3O_4$ synthesized in a laboratory was used as a catalyst in the cracking reaction of the heavy hydrocarbon fraction.

Example 3

(b) The same method as in Example 1 was used except that no secondary calcination was conducted in the process of preparing a hollow carbon structure.

Comparative Example

Used was activated carbon which has almost carbonaceous constituents, high adsorbability, and low cost such that it is frequently used commercially. A product of 2GA-H2J manufactured by KURARAY CHEMICAL CO., LTD was used as the activated carbon, and physical properties thereof were shown in the following Table 2.

TABLE 2

| Property | Activated carbon |
| --- | --- |
| Type | Cylindrical |
| Particle size (mm) | 1.7-2.36 |
| Particle porosity (g/cm$^3$) | 0.433 |
| Average pore diameter (nm) | 1.67 |
| Pellet density (g/cm$^3$) | 0.85 |
| Heat capacity (cal/gK) | 0.25 |
| Total surface area (m$^2$/g) | 1306.4 |

Experimental Example (1) Structure Analysis of Hollow Carbon Structure

The structure of hollow carbon structures prepared in Examples 1 and 2 was analyzed using SEM and TEM.

Figure 2A:
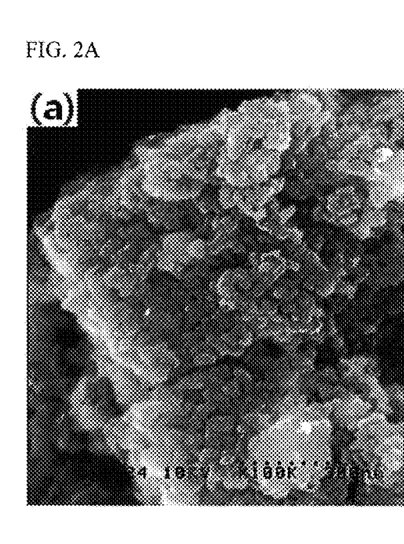
FIGS. 2A and 2B show SEM images of a hollow carbon structure according to Example 1 of the present invention.
Figure 2B:
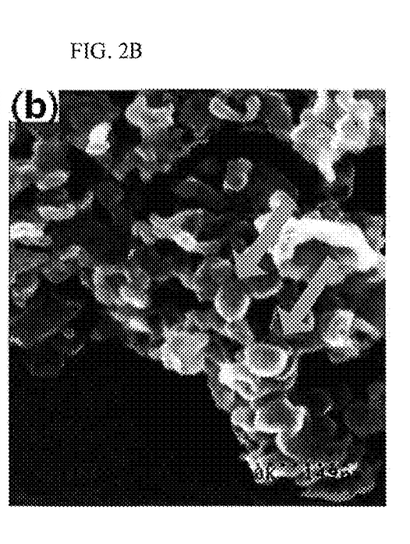
Figure 3:
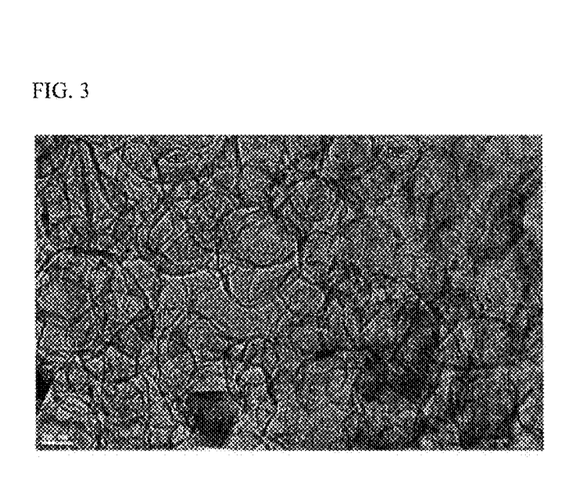
FIG. 3 shows TEM images according to Example 1 of the present invention.
Figure 4A:
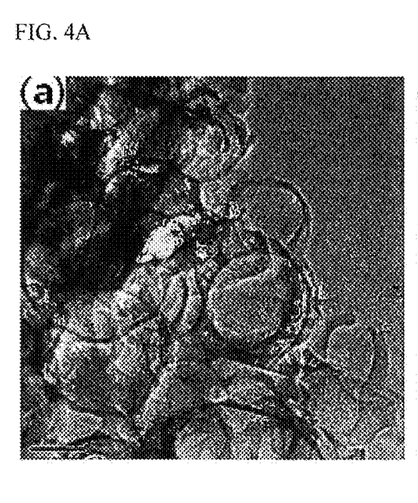
FIGS. 4A and 4B show TEM images according to Example 2 of the present invention.
Figure 4B:
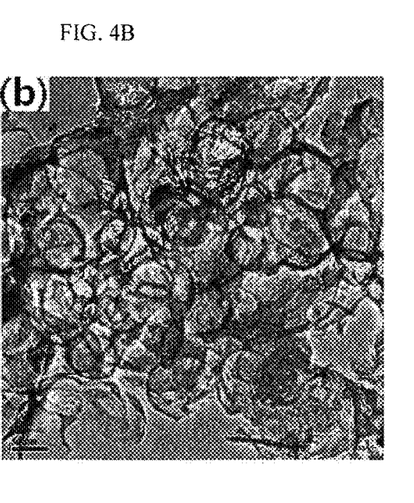

In the present invention, FIG. 2 shows SEM images of a hollow carbon structure according to Example 1, FIG. 3 shows TEM images of a hollow carbon structure according to Example 1, and FIG. 4 shows TEM images of a hollow carbon structure according to Example 2.

As shown in FIGS. 2 to 4, it may be observed that a hollow carbon structure prepared according to the embodiment of the present invention has an average particle diameter in the range of about 20 to 120 nm, a hollow inside, and a nanometer-thick carbon shell having a thickness in the range of 2 to 4 nm.

(2) Crystallinity Analysis of Hollow Carbon Structure

Figure 5:
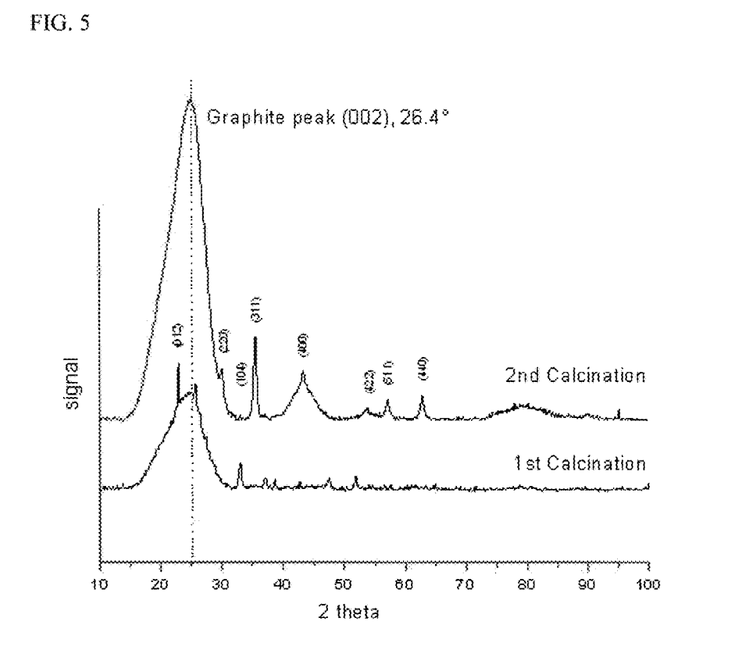
FIG. 5 shows an XRD analysis graph of hollow carbon structures prepared in Examples 1 and 3 of the present invention.

The crystallinity of a hollow carbon structure which underwent a primary calcination process (Example 3) and a hollow carbon structure which underwent a secondary calcination process (Example 1) was analyzed using XRD, and shown in FIG. 5.

Referring to FIG. 5, it may be determined that the hollow carbon structure which underwent the secondary calcination process (Example 1) has a higher graphite peak than the hollow carbon structure which underwent a primary calcination process (Example 3). Accordingly, a hollow carbon structure may be prepared to have further regular crystallinity through the secondary calcination.

(3) Analysis of Sulfur Content of Hollow Carbon Structure

Figure 6:
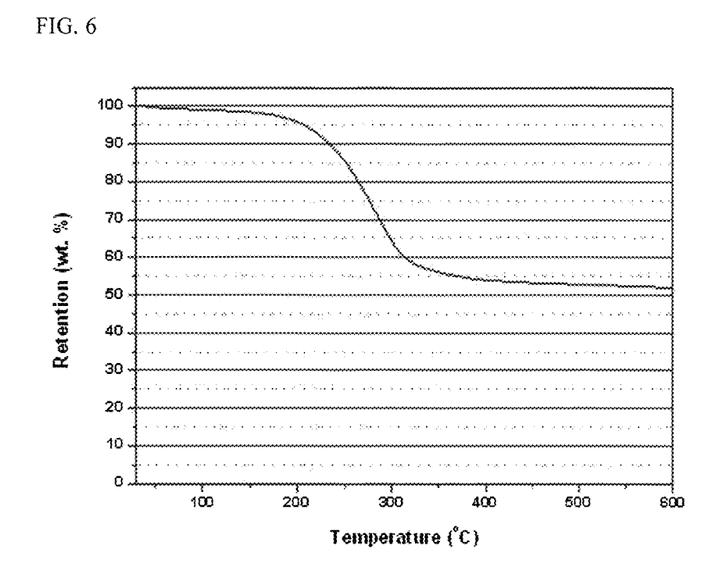
FIG. 6 shows an analysis graph of a sulfur content of a hollow carbon structure prepared in Example 3 of the present invention.

The sulfur content of a hollow carbon structure prepared in Example 3 was analyzed using TGA, and shown in FIG. 6.

Referring to FIG. 6, the sulfur content of a hollow carbon structure accounts for about 48%, and a hollow carbon structure containing the above-described sulfur content is advantageous in that the hollow carbon structure may be produced as a battery material. Further, since a sulfur component is removed at about 200° C., it may be predicted that the sulfur content of a hollow carbon structure may be reduced after the secondary calcination process.

(4) Measurement of Specific Surface Area of Hollow Carbon Structure

Figure 7A:
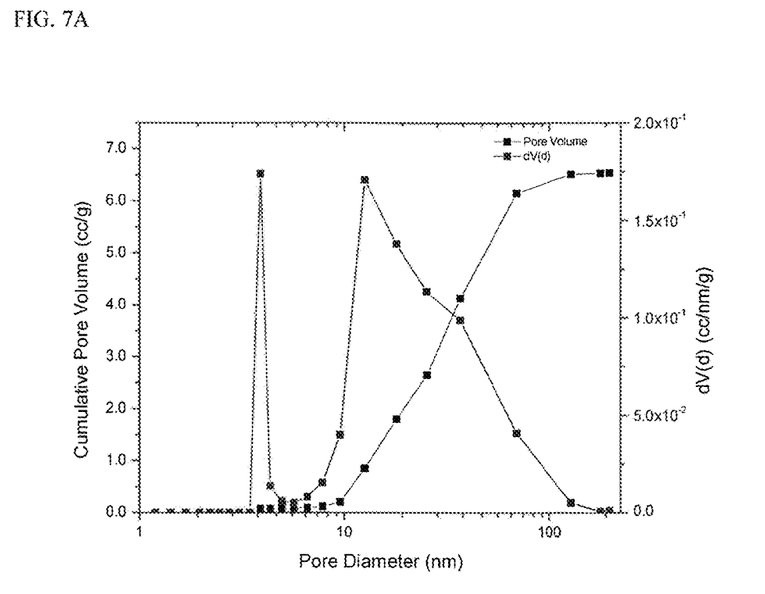
FIGS. 7A and 7B show a graph of measurement of pore-size distribution by conducting a nitrogen adsorption/desorption isothermal reaction of a hollow carbon structure and activated carbon according to Example 1 and Comparative Example of the present invention.
Figure 7B:
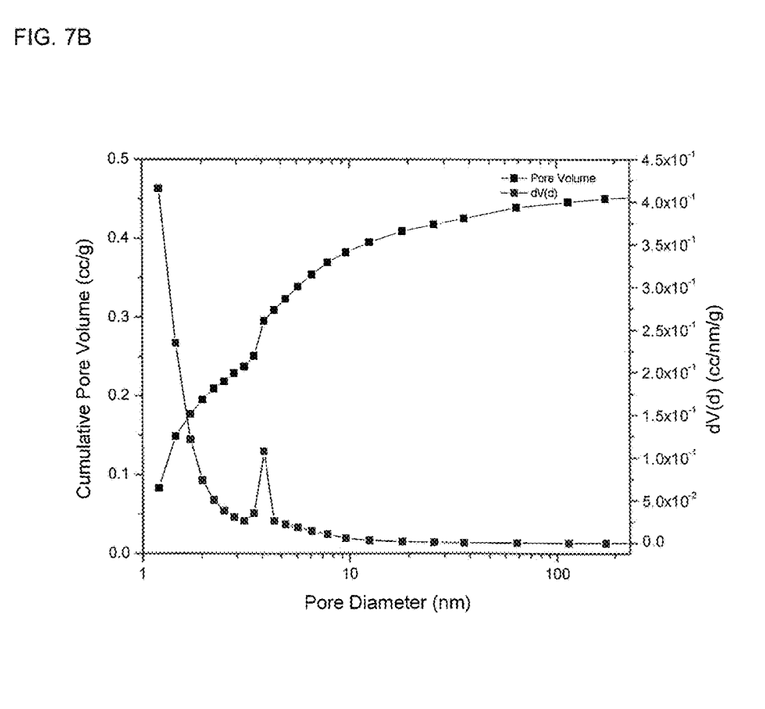

The specific surface area of a hollow carbon structure (Example 1) and activated carbon (Comparative Example) was measured through a nitrogen adsorption/desorption isothermal reaction using Autosorb-iQ MP manufactured by Quantachrome instruments corporation, and shown in the following Table 3 and FIG. 7. In FIG. 7, (a) shows the analysis graph of the pore size distribution, which is measured through a nitrogen adsorption/desorption isothermal reaction of a hollow carbon structure prepared in Example 1, and (b) shows the analysis graph of the pore size distribution, which is measured through a nitrogen adsorption/desorption isothermal reaction of activated carbon prepared in Comparative Example.

As shown in the following Table 3 and FIG. 7, activated carbon prepared in Comparative Example has a large micropore area, and a hollow carbon structure prepared according to Example 1 has greater mesopore areas than micropore areas. Further, it may be determined that a hollow carbon structure has a specific surface area similar to activated carbon (Comparative Example).

TABLE 3

| | Example 1 | Comparative Example |
| --- | --- | --- |
| Surface area data | | |
| Multipoint BET [m$^2$/g] | 988.7 | 1335.7 |
| BJH method [m$^2$/g] | 989.3 | 762.9 |
| Pore volume data | | |
| BJH method [cc/g] | 6.55 | 0.45 |
| SF method micropore volume [cc/g] | 0.32 | 0.46 |
| Pore size data | | |
| Average pore radius [nm] | 26.5 | 2.2 |
| SF method [nm] | 0.96 | 0.46 |
| HK method [nm] | 0.56 | 0.54 |
| V-t method | | |
| Micropore volume [cc/g] | 0.099 | 0.457 |
| Micropore area [m$^2$/g] | 216.5 | 1123.9 |
| External surface area [m$^2$/g] | 772.2 | 211.9 |

Figure 8A:
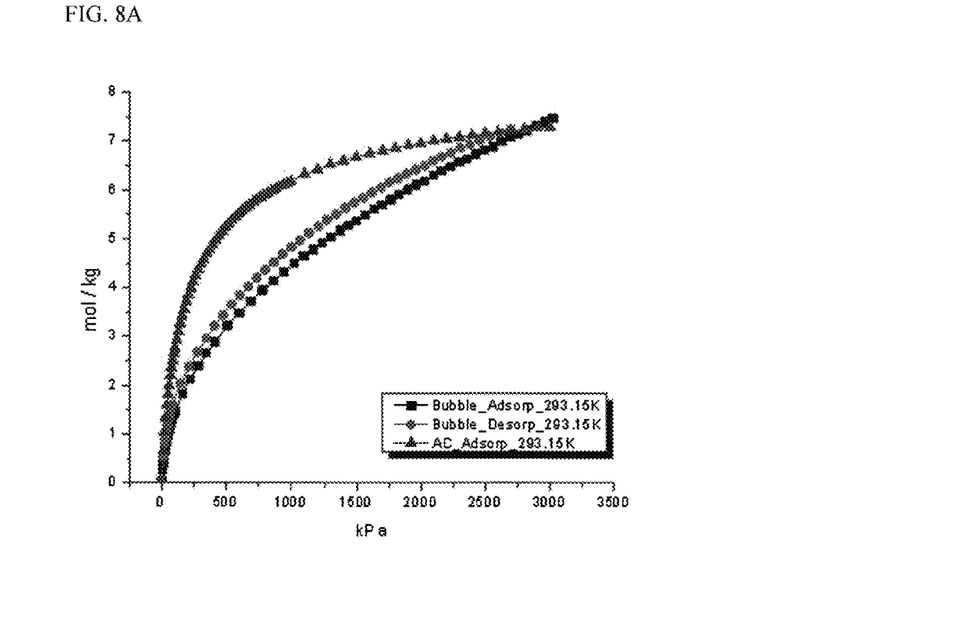
FIGS. 8A and 8B show a graph of a carbon dioxide adsorption/desorption isotherm of a hollow carbon structure and activated carbon according to Example 1 and Comparative Example of the present invention.
Figure 8B:
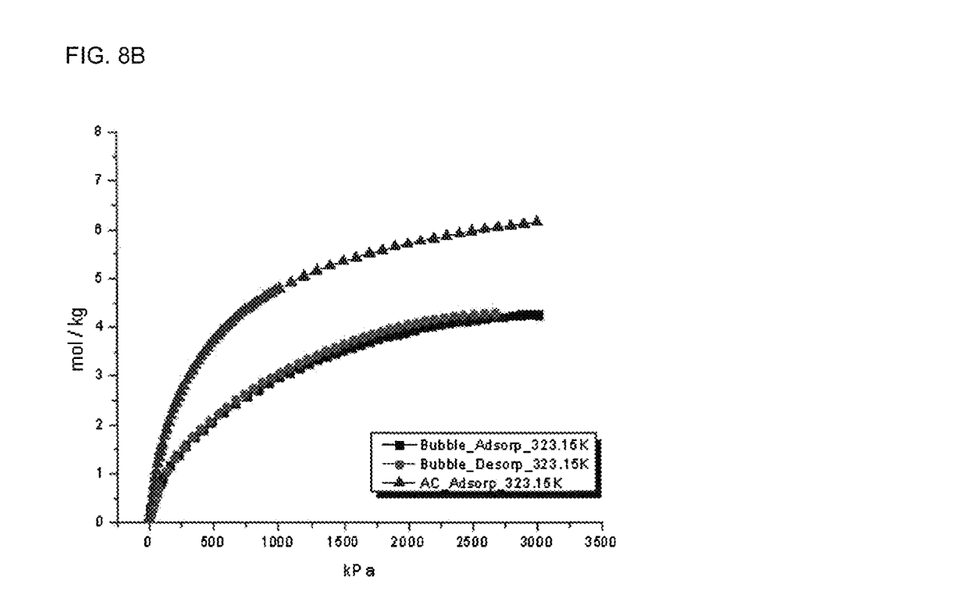

(5) Carbon Dioxide Adsorption/Desorption Isothermal Reaction of Hollow Carbon Structure The carbon dioxide adsorption/desorption isothermal reactions of a hollow carbon structure (represented as a bubble) according to Example 1 and activated carbon (AC) according to Comparative Example were compared under two temperature conditions (293.15 K and 323.15 K), and shown in FIG. 8.

As shown in FIG. 8, under condition (a) of a temperature of 293.15 K, it may be determined that the adsorption amount of the activated carbon according to Comparative Example is greater than that of the hollow carbon structure according to Example 1 at a pressure of 3,000 kPa or less, and the adsorption amount of the activated carbon according to Comparative Example is the same as that of the hollow carbon structure according to Example 1 at a pressure of 3,000 kPa. Further, it may be observed that the desorption of carbon dioxide occurs well in the hollow carbon structure than in the activated carbon.

The result under condition (b) of a temperature of 323.15 K can be seen to be similar to above. Since regeneration cost should be taken into account to be used as a adsorbent for a continuous adsorption process, a hollow carbon structure prepared according to the embodiment of the present invention is advantageous to be used in a continuous adsorption process in that the desorption reaction thereof occurs well.

Figure 9:
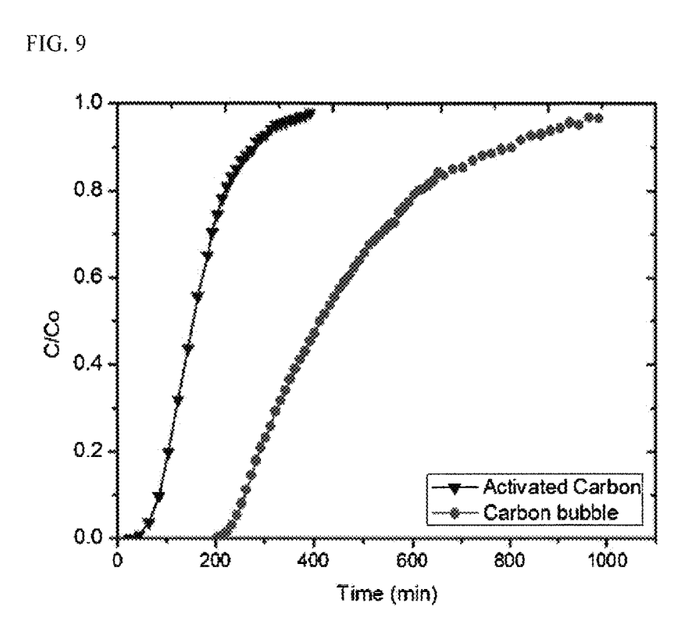
FIG. 9 shows an analysis graph of the sulfur compound removal capacity of a hollow carbon structure and activated carbon according to Example 1 and Comparative Example of the present invention.

(6) Measurement of Sulfur Compound Removal Capability of Hollow Carbon Structure The sulfur compound removal capabilities of a hollow carbon structure (carbon bubble, Example 1) and activated carbon (Comparative Example) were measured using a mixed gas of a mercaptan which is a sulfur compound and methane, and shown in FIG. 9 and Table 5. Test conditions were represented in the following Table 4.

When a mixed gas of a sulfur compound was flowed into the predetermined amount of adsorbents, the concentration of the mercaptan was measured in a gas discharged from the hollow carbon structure after 204 minutes, and also measured in a gas discharged from the activated carbon after 24 minutes. That is, it may be determined that the hollow carbon structure according to the embodiment of the present invention has a longer saturation time and greater adsorption capacity than those of the activated carbon. Accordingly, the hollow carbon structure is more excellent than the activated carbon as an adsorbent for a sulfur compound.

TABLE 4

| Conditions | |
|---|---|
| Temperature | 15° C. |
| Adsorbent (carbon bubble or activated carbon) mass | 50 mg |
| Mixed gas rate | 16.7 cc/min |
| mercaptan concentration | 291 μmol/mol |

TABLE 5

| Sample | Breakthrough time (min) | Saturation time (min) | Adsorption capacity (mmol/g) |
|---|---|---|---|
| Example 1 | 204 | 924 | 1.792 |
| Comparative Example | 24 | 324 | 0.668 |

The invention claimed is:

1. A method of producing a hollow carbon structure, the method comprising:
   a step of calcining a solid component which includes a residue of a heavy hydrocarbon fraction, a carbonaceous material generated during a reaction, and a spent catalyst separated after a cracking reaction of a heavy hydrocarbon fraction; and
   a step of performing an acid treatment or base treatment on the solid component calcined in the above-described step.

2. The method of claim 1, wherein the cracking reaction of the heavy hydrocarbon fraction includes a step of performing a cracking reaction of the heavy hydrocarbon fraction by controlling internal conditions of a reactor having a hydrocarbon solvent, the heavy hydrocarbon fraction, and a catalyst contained therein to be in a supercritical or subcritical state; and
   a step of separating a liquid oil fraction and a solid component generated by the cracking reaction.

3. The method of claim 2, wherein the heavy hydrocarbon fraction is a vacuum residue, crude oil, an atmospheric residue, a residue of a hydrogenation reaction, or oil sand.

4. The method of claim 2, wherein the hydrocarbon solvent is dodecane, xylene, tetralin, or a mixture thereof.

5. The method of claim 2, wherein the catalyst is a metal-based or non-metal-based oxide catalyst.

6. The method of claim 1, wherein a step of cleaning and drying the solid component is performed before the step of calcining the solid component.

7. The method of claim 1, wherein the calcining is performed at 550 to 650° C. for 1 to 12 hours.

8. The method of claim 1, wherein the acid treatment or base treatment is performed for 6 to 20 hours using a solution including an acid or base and distilled water at a volume ratio of 1:1 to 1:5.

9. The method of claim 1, comprising a step of secondarily calcining the solid component subjected to the acid or base treatment.

10. The method of claim 9, wherein the secondarily calcining is performed at 700 to 1,200° C. for 1 to 12 hours.

* * * * *